United States Patent [19]
Oda

[11] Patent Number: 5,326,977
[45] Date of Patent: Jul. 5, 1994

[54] GAMMA-RAY COMPENSATED IONIZATION CHAMBER

[75] Inventor: Minoru Oda, Kobe, Japan

[73] Assignee: Mitsubishi Denki Kabushiki Kaisha, Tokyo, Japan

[21] Appl. No.: 889,243

[22] Filed: May 28, 1992

[30] Foreign Application Priority Data

Jun. 10, 1991 [JP] Japan ................. 3-163342

[51] Int. Cl.$^5$ .................. G01T 3/00; G01T 1/185
[52] U.S. Cl. ................. 250/390.01; 250/374; 250/385.1; 313/93
[58] Field of Search ............. 250/390.01, 385.1, 374; 313/93

[56] References Cited

U.S. PATENT DOCUMENTS

| | | | |
|---|---|---|---|
| 3,676,682 | 7/1972 | Falk | 250/385.1 |
| 3,961,196 | 6/1976 | Alexeev et al. | 250/385.1 |
| 4,376,892 | 3/1983 | Charpak et al. | 250/385.1 |
| 4,583,020 | 4/1986 | Cliquet et al. | 250/374 |
| 4,682,036 | 7/1987 | Wakayama et al. | 250/374 |
| 5,192,868 | 3/1993 | Dudley | 250/385.1 |
| 5,223,717 | 6/1993 | Charpak | 250/385.1 |

OTHER PUBLICATIONS

"Measurements of Nuclear Radiation", p. 99, Nikkan Kogyo Shimbun, Inc., 1978.
Patent Abstracts of Japan, vol. 9, No. 210, Aug. 28, 1985, p. 92 Kokai No. 60-71975.

Primary Examiner—Paul M. Dzierzynski
Assistant Examiner—Drew A. Dunn
Attorney, Agent, or Firm—Rothwell, Figg, Ernst & Kurz

[57] ABSTRACT

A gamma-ray compensated ionization chamber wherein the state of compensating a gamma-ray is controlled by utilizing the effect that a change in the applied voltage ratio of a high-voltage electrode to a compensating electrode changes the form of an electric field around the holes in a signal electrode.

7 Claims, 7 Drawing Sheets

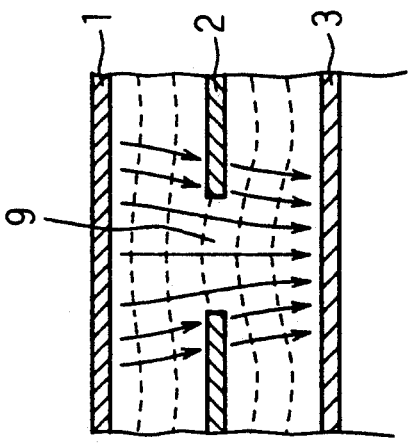
Fig. 4(a) $V_H > V_C$
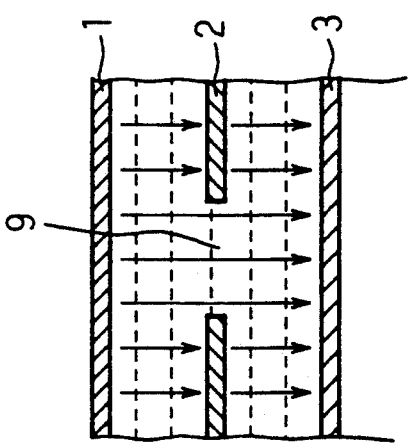
Fig. 4(b) $V_H = V_C$
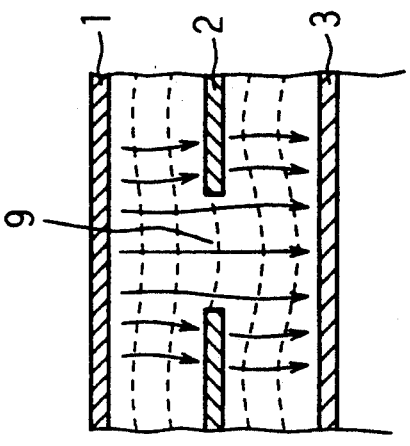
Fig. 4(c) $V_H < V_C$

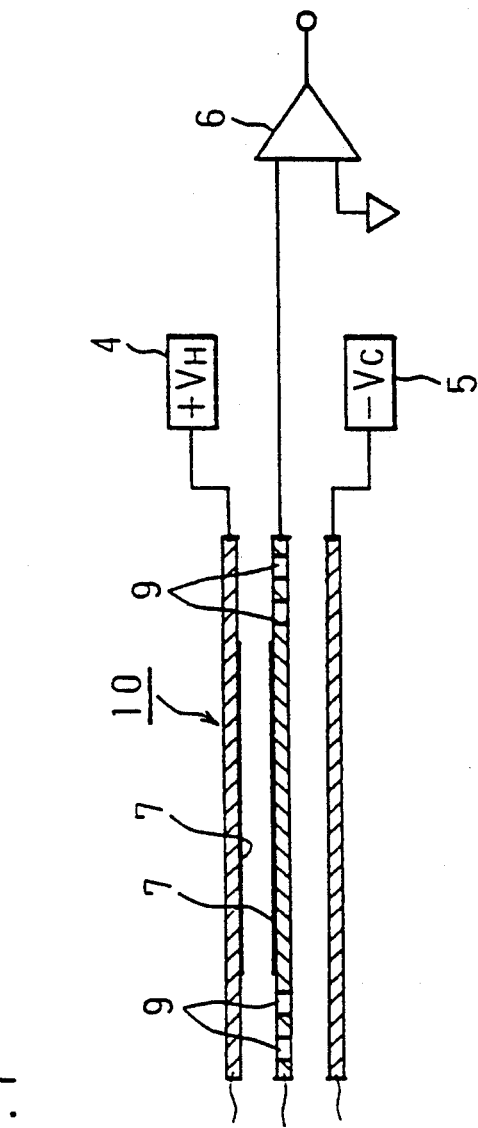

GAMMA-RAY COMPENSATED IONIZATION CHAMBER

BACKGROUND OF THE INVENTION

1. Field of the Invention

The present invention relates to a gamma-ray compensated ionization chamber used for counting only neutrons under the presence of gamma rays in a nuclear reactor or the like.

2. Description of the Related Art

FIG. 1 is a schematic diagram showing the construction of a conventional gamma-ray compensated ionization chamber (hereinafter abbreviated as CIC) depicted, for example, in "Measurements of Nuclear Radiation" (pp. 98–102, Nikkan Kogyo Shimbun, Inc., 1978). As shown in the FIGURE, the CIC 10 comprises three cylindrical electrodes disposed concentrically: a high-voltage electrode 1 as the outermost electrode; a signal electrode 21 disposed inwardly spaced apart from the high-voltage electrode 1; and a compensating electrode 31 disposed inwardly spaced apart from the signal electrode 21. A high-voltage power supply 4 applies a high voltage $+V_H$ to the high-voltage electrode 1, while a compensating power supply 5 applies a compensating voltage $-V_c$ to the compensating electrode 31. The neutron current obtained from the signal electrode 21 is amplified through an amplifier 6.

The inside surface of the high-voltage electrode 1 and the outside surface of the signal electrode 21 are coated with a neutron-sensitive material 7 such as $^{10}B$. The outside surface of the compensating electrode 31 is provided with a plurality of circumferentially extending grooves 8.

In operation, when the gamma rays emitted by the nuclear reaction and neutrons are radiated to the CIC 10, a neutron current In caused by the neutron-sensitive material 7 and a current $I\gamma_1$ caused by the gamma rays flow through the space (neutron ionization chamber) between the high-voltage electrode 1 and the signal electrode 21. At the same time, another gamma-ray current $I\gamma_2$ flows through the space (compensating ionization chamber) between the signal electrode 21 and the compensating electrode 31.

Because the applied currents from the high-voltage power supply 4 and the compensating power supply 5, respectively connected to the high-voltage electrode 1 and the compensating electrode 31, are opposite in polarities to each other, the ionization currents flowing in the two respective chambers flow in opposite directions to each other with respect to the signal electrode 21. When the current flowing to the signal electrode 21 is denoted as Isig, the following equation is given.

$$Isig = In + I\gamma_1 - I\gamma_2 \quad (1)$$

If $I\gamma_1$ and $I\gamma_2$ are equal, we have $$Isig = In \quad (2)$$

Thus, the net neutron current without containing the gamma-ray current can be measured. This operation is the gamma-ray compensation employed in the CIC 10. The neutron current In is detected from the signal electrode 21 and is amplified through the amplifier 6.

Since an ionization chamber in which $I\gamma_1$ and $I\gamma_2$ are exactly equal is difficult to construct, a large number of narrow grooves 8 are provided on the outer circumferential surface of the compensating electrode 31 so as to exactly equalize $I\gamma_2$ to $I\gamma_1$ by controlling the voltage $-V_c$ supplied from the compensating power supply 5. The reason that $I\gamma_2$ is varied by the grooves 8 on the outside surface of the compensating electrode 31 is as follows.

Since the electric field strength inside the groove 8 is weak, ionized electrons are not completely collected so that the portion of the electrode 31 having the grooves 8 is ineffective an does not effectively function as an ionization chamber. The volume of this ineffective portion depends on the compensating voltage Vc supplied from the compensating power supply 5; it decreases as the voltage Vc increases. Therefore, the effective volume of the ionization chamber is varied by controlling the compensating voltage Vc so as to equalize $I\gamma_2$ to $I\gamma_1$.

In the above construction of the conventional gamma-ray compensated ionization chamber, the gamma ray current is compensated by controlling the compensating voltage Vc. The volume of the ineffective portion resulting from the weak field strength inside the grooves 8 is unstable, however, because the compensating conditions vary with changes in external conditions such as the intensity and energy of gamma rays, thus resulting in overcompensation or undercompensation.

SUMMARY OF THE INVENTION

It is an object of the present invention to overcome the above problems to provide a gamma-ray compensated ionization chamber wherein the gamma ray compensating conditions are insusceptible to changes in external conditions, thereby assuring stable compensation and high neutron measuring accuracy.

BRIEF DESCRIPTION OF THE DRAWINGS

FIGS. 4a, 4b and 4c are a diagram illustrating the principle of the CIC of the present invention, FIG. 7 is a schematic diagram showing a construction of a CIC according to a fourth embodiment of the invention.

DESCRIPTION OF THE PREFERRED EMBODIMENTS

The CIC of the present invention will now be described with the accompanying drawings.

EMBODIMENT 1

Figure 2:
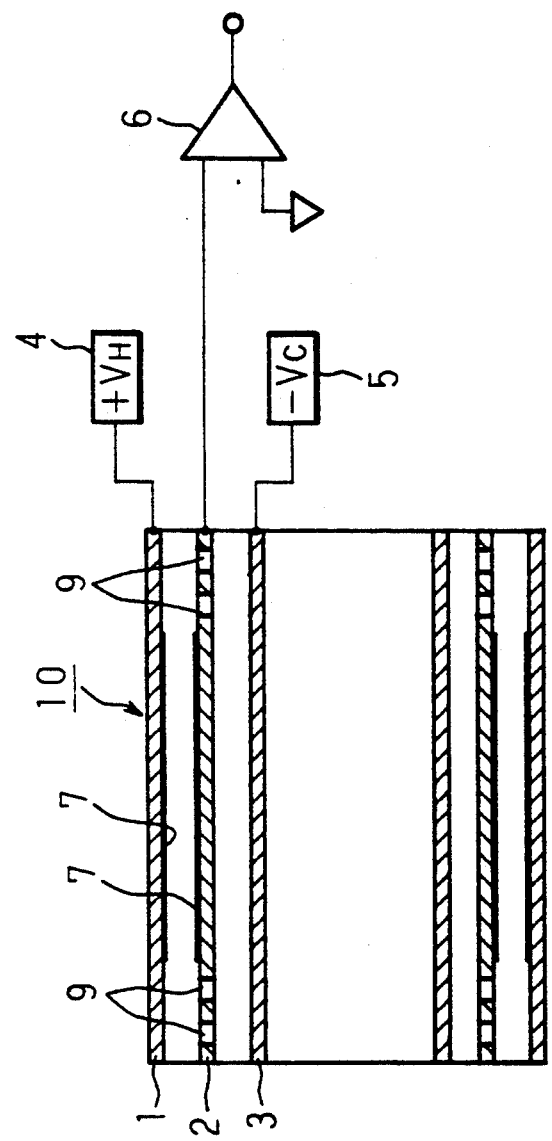
FIG. 2 is a schematic diagram showing the construction of a CIC according to a first embodiment of the present invention.

FIG. 2 is a schematic diagram showing the construction of a CIC according to the first embodiment of the present invention. As shown in the FIGURE, the CIC 10 comprises three cylindrical electrodes disposed concentrically: a high-voltage electrode 1 as the outermost electrode; a signal electrode 2 disposed inwardly spaced apart from the high-voltage electrode 1; and a compensating electrode 3 disposed inwardly spaced apart from the signal electrode 2. A high-voltage power supply 4 applies a high voltage $+V_H$ to the high-voltage electrode 1, while a compensating power supply 5 applies a compensating voltage $-Vc$ to the compensating electrode. The neutron current detected from the signal electrode 2 is amplified through an amplifier 6.

Figure 3:
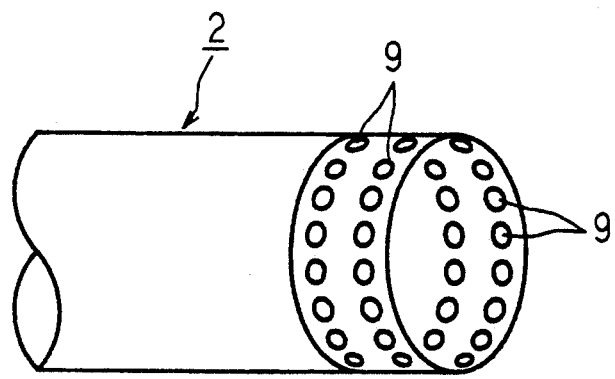
FIG. 3 is a partial perspective view showing the CIC according to the first embodiment of the present invention.

The inside surface of the high-voltage electrode 1 and the outside surface of the signal electrode 2 are coated with a neutron-sensitive material 7 such as $^{10}B$. A plurality of small-diameter holes 9 are formed in both axially endmost portions of the signal electrode 2; in this embodiment, 48 holes 9 of 5 mm diameter are formed. FIG. 3 is a perspective view showing one of the endmost portions of the signal electrode 2 with the holes 9 formed therein.

The operation of the above CIC will now be described.

FIG. 4 is a diagram illustrating the operating principle of the first embodiment with an electric field formed around one of the holes 9 in the signal electrode 2, wherein dashed lines indicate equipotential lines and solid lines designate electric force lines. FIG. 4(a) illustrates the case where the voltage $V_H$ from the high-voltage power supply 4 is higher than the voltage Vc from the compensating power supply 5, FIG. 4(b) for $V_H=Vc$, and FIG. 4(c) for $V_H<Vc$.

As shown in FIGS. 4(a), 4(b), 4(c), the form of the electric field around the hole 9 in the signal electrode 2 changes when the magnitude of Vc changes relative to $V_H$, which causes a difference in the effective volumes of the neutron ionization chamber in the upper part of the figure and the compensating ionization chamber in the lower part. More specifically, in the space surrounded by the electric force lines passing through the hole 9, the ionized electrons are not collected by the signal electrode 2 and the ionization current flows from the high-voltage electrode 1 toward the compensating electrode 31; therefore, an ineffective portion which does not contribute to the detection of the neutron current occurs. Since the ineffective volume in the neutron ionization chamber and compensating ionization chamber differs according to the change in the relationship between $V_H$ and Vc (more properly, the voltage ratio: $V_H$Vc), thus controlling the effective volume becomes possible.

Figure 1:
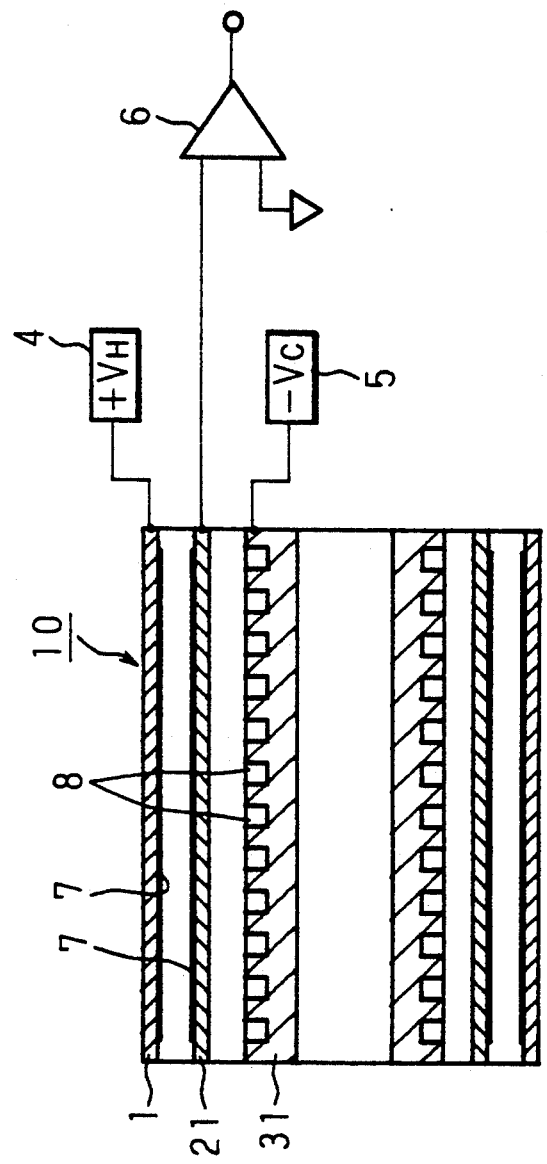
FIG. 1 is a schematic diagram showing the construction of a conventional CIC.

Since the control of the effective volume utilizing the above effect does not rely on unstable factors such as the ineffective volume created by the weak field strength inside the grooves 8 as the conventional CIC of FIG. 1 does, the arrangement of this embodiment can achieve stable gamma-ray compensation.

In the above arrangement, the controllable amount of the effective volume is substantially proportional to the total peripheral lengths of the holes 9. Therefore, in order to increase the controllable amount, it is more preferable to form a large number of small-diameter holes, thereby increasing the total peripheral lengths, rather than to form a small number of large-diameter holes. The proper diameter of the holes is about one to three times as long as the spaced distance between the electrodes.

EMBODIMENT 2

Figure 5:
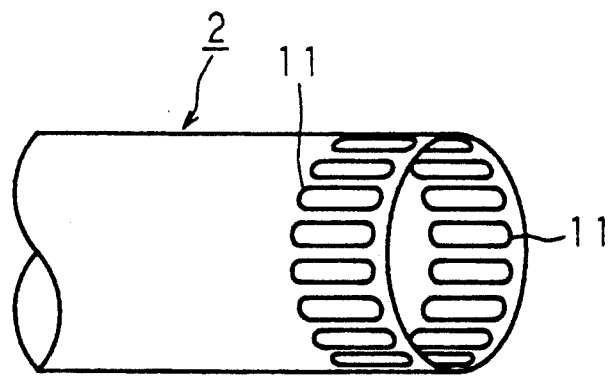
FIG. 5 is a partial perspective view showing a CIC according to a second embodiment of the present invention.

FIG. 5 is a perspective view showing one end portion of a signal electrode 2 in a CIC according to the second embodiment of the invention. In this embodiment, instead of the holes 9 in the first embodiment, a plurality of elliptic slits 11 are formed circumferentially around the signal electrode 2 in the endmost portions thereof. The evenly spaced, nearly parallel slits 11 formed along the circumference are an effective configuration to increase the total peripheral lengths thereof. This configuration is also proper to maintain the mechanical strength of the signal electrode 2.

EMBODIMENT 3

Figure 6A:
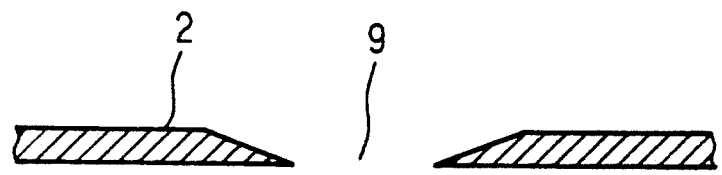
FIGS. 6a and 6b are a partial perspective view showing a CIC according to a third embodiment of the present invention.
Figure 6B:
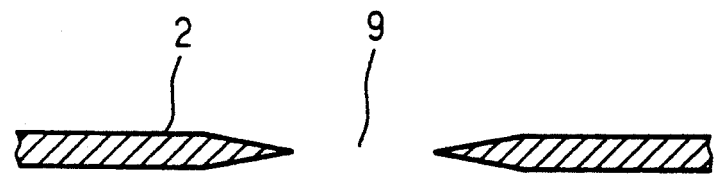

FIGS. 6(a) and 6(b) are cross sectional views showing a portion of a signal electrode 2 in a CIC according to the third embodiment of the invention. In this embodiment, the periphery of each hole 9 is tapered so as to eliminate the occurrence of a slight weak electric field near the inside the hole 9. This configuration serves to further enhance the stability of the gamma-ray compensation.

EMBODIMENT 4

In the foregoing embodiments 1, 2 and 3, the high-voltage electrode 1, the signal electrode 2, and the compensating electrode 3 are cylindrical electrodes disposed concentrically, but alternatively, these electrodes may be flat as shown in FIG. 7.

What is claimed is:

1. A gamma-ray compensated ionization chamber having a neutron ionization chamber and a compensating ionization chamber formed among a first electrode, a second central electrode, and a third electrode disposed apart from one another at a prescribed distance, means for measuring a neutron flux from a neutron current outputted by the central electrode, wherein a gamma-ray current component contained in an ionization current flowing in the neutron ionization chamber from said first electrode to the second central electrode is compensated by a gamma-ray ionization current flowing in the compensating chamber from said second central electrode to said third electrode, comprising:
   a plurality of holes formed in said second central electrode for passing through an electrode force from said first electrode to said third electrode; and
   means for varying the ratio of a voltage potential of the first electrode to a voltage potential of said third electrode;
   whereby the effective volumes of both chambers where the gamma-ray currents flow are varied by a change in electric force from the neutron ionization chamber to the compensating ionization chamber through said plurality of holes so as to equalize the quantity of the gamma-ray currents flowing in both chambers.

2. A gamma-ray compensated ionization chamber as set forth in claim 1, wherein said holes are circular.

3. A gamma-ray compensated ionization chamber as set forth in claim 2, wherein the diameter of said holes are from one to three times as long as said spaced distance between the electrodes.

4. A gamma-ray compensated ionization chamber as set forth in claim 1, wherein the peripheries of said holes are tapered.

5. A gamma-ray compensated ionization chamber as set forth in claim 1, wherein said holes are elliptic.

6. A gamma-ray compensated ionization chamber as set forth in claim 1, wherein said three electrodes are cylindrical.

7. A gamma-ray compensated ionization chamber as set forth in claim 1, wherein said three electrodes are flat. z

* * * * *

UNITED STATES PATENT AND TRADEMARK OFFICE
CERTIFICATE OF CORRECTION

PATENT NO. : 5,326,977
DATED : July 5, 1994
INVENTOR(S) : Minoru Oda

It is certified that error appears in the above-indentified patent and that said Letters Patent is hereby corrected as shown below:

Col. 2, line 10, "an" (second occurrence) should be --and--.

Col. 3, line 45, "$V_H Vc$" should be --$V_H/Vc$-- .

Col. 4, line 67, "flat.z" should be --flat.--.

Signed and Sealed this

Twenty-eight Day of February, 1995

*Attest:*

BRUCE LEHMAN

*Attesting Officer*     *Commissioner of Patents and Trademarks*